United States Patent [19]

Higuchi

[11] Patent Number: 4,890,636

[45] Date of Patent: Jan. 2, 1990

[54] FLUID PRESSURE CONTROL FOR USE IN TRANSMISSION

[75] Inventor: Shunichiro Higuchi, Yokohama, Japan

[73] Assignee: Okamura Corporation, Yokohama, Japan

[21] Appl. No.: 282,016

[22] Filed: Dec. 8, 1988

[30] Foreign Application Priority Data

Aug. 15, 1988 [JP] Japan .................................. 63-201872

[51] Int. Cl.⁴ ............................................. F15B 13/02
[52] U.S. Cl. .................. 137/115; 192/87.13; 192/109 F
[58] Field of Search ...................... 137/115; 192/87.13, 192/109 F

[56] References Cited

U.S. PATENT DOCUMENTS

| | | | |
|---|---|---|---|
| 3,468,194 | 9/1969 | Horsch et al. | 192/109 F X |
| 4,132,302 | 1/1979 | Chatterjea . | |
| 4,216,851 | 8/1980 | Chatterjea . | |
| 4,311,068 | 1/1982 | Chatterjea . | |
| 4,387,731 | 6/1983 | Chatterjea | 192/109 F X |

FOREIGN PATENT DOCUMENTS 46-21137  6/1971  Japan .

Primary Examiner—Gerald A. Michalsky
Attorney, Agent, or Firm—Poms, Smith, Lande & Rose

[57] ABSTRACT

A fluid pressure control for a transmission having a fluid pressure operated clutch includes a pressure regulating piston communicating with a pressurized fluid source for affording fluid pressure to the clutch; a load piston disposed in a common bore with the pressure regulating piston wherein the pistons are reciprocally disposed in such common bore and are biased away from one another by an associated spring; and a signal pressure chamber is formed between an end of the bore and an end wall of the load piston and communicates with a fluid passage running from the pressurized fluid source to the clutch. Concaved fluid communication grooves are provided in a sliding face of the load piston wherein a first groove communicates with the signal pressure chamber, a second groove communicates with a discharge port and a third groove communicates with the pressurized fluid source via a timing orifice. A shifting piston is provided which reciprocatingly moves between opened and closed positions within the load piston to thereby increase or reduce pressurizing within the signal pressure chamber in accordance with positions of the load piston and the shifting piston.

5 Claims, 4 Drawing Sheets

FLUID PRESSURE CONTROL FOR USE IN TRANSMISSION

BACKGROUND OF THE INVENTION

The present invention relates to a fluid pressure control for smoothly effecting shifting of a transmission of a vehicle, which is a general term for automobiles, industrial vehicles, vehicles for use in a building site and the others.

It more specifically relates to a fluid pressure control which is so constructed as to, in a transmission provided with one or more speed-change clutches, control a fill pressure to the lowest necessary value in order to ensure smooth engagement of the clutches when the fill pressure is flowed into clutch cylinders concerned in response to speed change to regulate a pressure rise from the pressure upon completion of the fill up to the final pressure of engagement and to maintain the final pressure of engagement thus attained.

Conventionally, there has been proposed a combination of a regulator valve, an accumulator and an orifice in order to attain the above-mentioned functions. However, in the above-mentioned combination, it is complicated and difficult to balance the orifice and flow path resistance, the clutch cylinder volume and the accumulator volume in order to obtain the lowest pressure required. In addition, it is liable to be affected by temperature change during the balancing operation.

An improved technique thereof is disclosed, for example, in Japanese patent publication No. 46-21137 in which there are provided a pressure modulating safety valve 28 and a differential pressure valve 29, the pressure modulating safety valve being discharged by the differential pressure valve upon effecting a speed shift such that the pressure modulating safety valve can perform the following modulation of the main hydraulic fluid.

In addition, U.S. Pat. Nos. 4,132,302, 4,216,851 (corresponding to Japanese patent publication No. 61-60298) and 4,311,068 disclose an invention in which a rate of rise valve assembly 108 including a pressure modulating valve 58 and a load piston 164 and a signal pressure control assembly 176 including a dump valve 174 and a clutch fill piston 194 are provided in a common bore 34 so as to form a signal pressure chamber 82 there between, and upon effecting a speed shift, the dump valve is actuated by a difference in pressure between a differential pressure chamber 80 within the signal pressure control assembly and the signal pressure chamber to discharge the rate of rise valve such that the rate of rise valve can perform the following modulation of fluid pressure.

However, in the above-mentioned prior art, the structure is complicated due to the provision of the dump valve (differential pressure valve) which is separately provided to discharge the rate of rise valve (the fluid pressure control) and there is a possibility that a lag is caused during the operation. In addition, the accurate operation can not be ensured due to the provision of the separate dump valve and is susceptible to the intrusion of dust and dirt or the difference in machining precision.

SUMMARY OF THE INVENTION

Accordingly, an object of the present invention is to provide a control device which can solve the above-mentioned problems associated with the prior art and which is relatively simple in structure and can operate accurately.

In order to attain the above-mentioned object, in the present invention, the differential pressure valve (or the signal pressure control valve) which is provided in the above-mentioned prior art is removed, and discharge, fill and modulation of fluid upon effecting the speed shift are directly performed by the fluid pressure control acting as the rate of rise valve.

Concretely speaking, according to the present invention, there is provided a fluid pressure control for use in a transmission which is provided with a fluid pressure operated clutch, characterized in that it comprises a pressure regulating piston communicating with fluid from a pressurized fluid source for affording fluid pressure to said clutch, a load piston and a spring for pressing said pistons away from each other, wherein said load piston and said pressure regulating piston are reciprocally disposed in a common bore; a signal pressure chamber is formed between an end wall of the load piston and an end of the bore and communicates with a fluid passage to said clutch from said pressurized fluid source; in a sliding face of the load piston in the bore there are provided a first concave groove communicating with the signal pressure chamber, a second concave groove communicating with a discharge port and a third concave groove communicating with the pressurized fluid source via a timing orifice and a shifting piston which reciprocatingly moves between open and closed positions is provided within the load piston, thereby increasing and reducing pressure within the signal pressure chamber in accordance with positions of the load piston and the shifting piston.

In the fluid pressure control according to the present invention, although the fluid pressure is filled within a selected clutch cylinder and hence the fluid pressure transiently varies and the load piston is moved, it never drops to the lowest value required due to the cylinder capacity and flow path routing conditions.

That is, the prior art needs a separate valving. However, in the present invention, the first and second concave grooves communicate with each other at initial moving points thereof and the load piston moves to the extreme end with the signal pressure chamber which is pressure reduced, by which the lowest pressure required can be obtained.

The fluid pressure from a pump passes through a timing orifice and fills a fill chamber over a predetermined period of time, by which the shifting piston is moved to the closed position. At this stage, the drain from the signal pressure chamber is closed.

In accordance with the above-mentioned operation, the fluid pressure within the signal pressure chamber moves the load piston to initiate modulation and passes through the first and second concave grooves. On the other hand, the shifting piston is in the closed position, so that the fluid is not drained.

Accordingly, the fluid pressure smoothly reaches the final value with a desired gradual pressure rise.

In this situation, the shifting piston within the load piston of the fluid pressure moves to the open position in preparation for the next modulation.

As has been described above, in the present invention, all the operations are performed by the load piston and the shifting piston. In addition, the structure is simple and there exist only a few trouble making factors. And the operation is directly effected, so that the accurate and time-lag-free operation can be realized.

BRIEF DESCRIPTION OF THE DRAWINGS

The above and other objects, features and advantages of the present invention will become apparent when, for a better understanding of the invention, reference is made to the following description taken in conjunction with the accompanying drawings which show a preferred embodiment thereof and in which.

DESCRIPTION OF THE PREFERRED EMBODIMENT OF THE INVENTION

Figure 1:
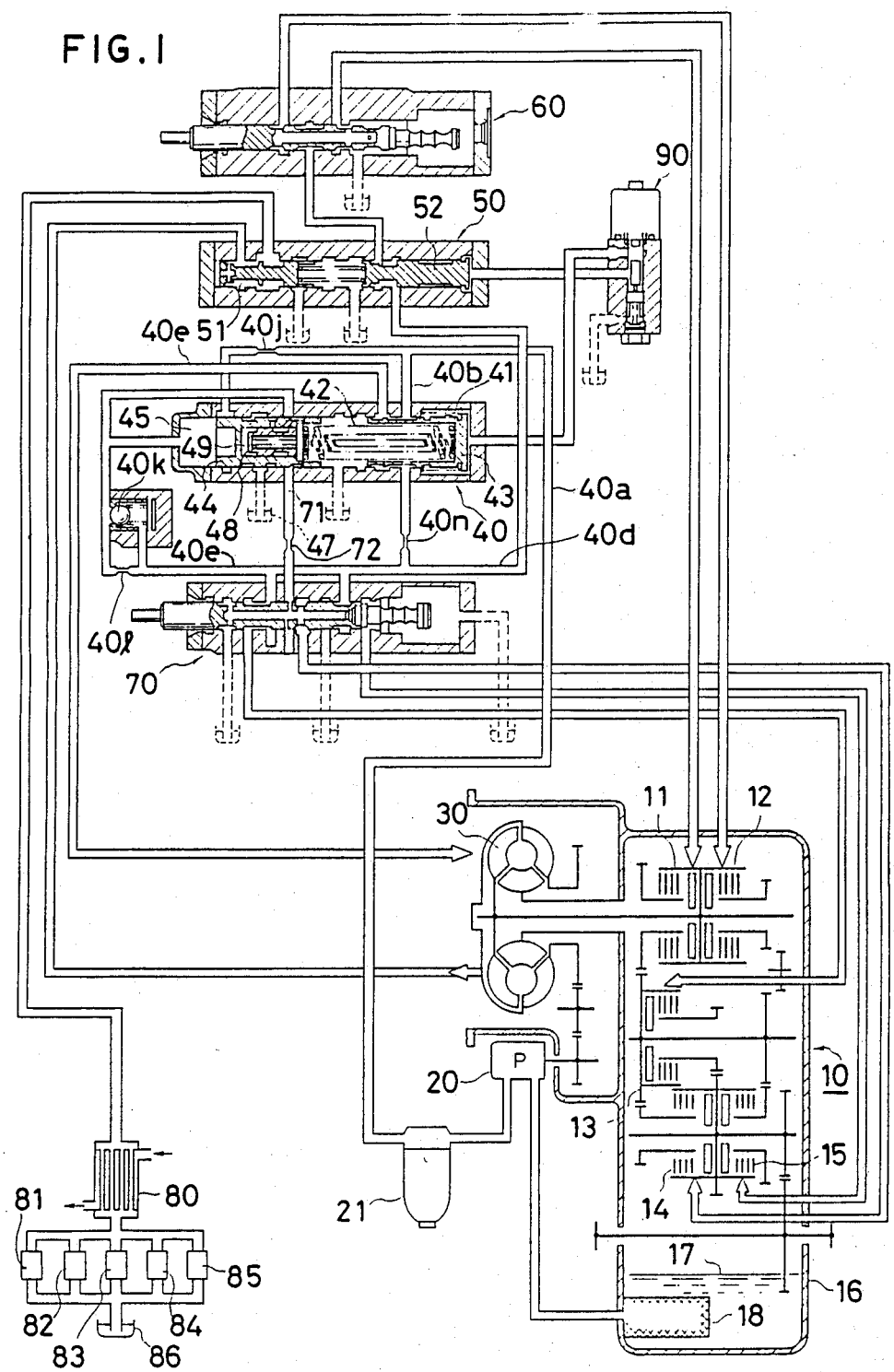
FIG. 1 is a longitudinal sectional view illustrating the entire structure of a transmission provided with a fluid pressure control according to an embodiment of the present invention.

A preferred embodiment of the present invention will be described with reference to the accompanying drawings.

Prior to the description of the present invention, the structure and operation of a vehicle transmission to which the present invention is applied will be summarized.

Power shift type reversible transmission 10 which is controlled by the present invention has three speeds in the forward range and three speeds in the reverse range. The transmission 10 is provided with a fluid pressure operated clutch mechanism capable of controlling the power-shifting operation by means of forward and reverse shifting clutch cylinders 11 and 12 and speed-change clutch cylinders 13, 14 and 15.

In front of the transmission 10, there are disposed a fluid pressure pump 20 which is driven by an engine (not shown) and a torque converter 30 which is driven by the engine to provide torque-amplified input to the transmission 10.

During the normal pressure regulation, oil 17 collected in a fluid receiver 16 in the transmission 10 is sucked through an inlet filter 18 in the fluid pressure pump 20 and sent through an outlet filter 21 to an input duct 40a of a cylinder-shaped fluid pressure control 40.

The fluid pressure flows through ducts 40b and 40c into a pressure regulator chamber 41 at the front end (a right-hand end in the drawing) and is regulated by a cylindrical pressure regulating piston 43 which is loaded by a spring 42 within the chamber 41.

The fluid pressure thus regulated passes through a relatively large orifice 40n and then is divided into two streams respectively flowing through ducts 40d and 40e. One stream through the duct 40d flows through a neutralizer valve 50 in a directional control valve 60 and the other stream through the duct 40e flows in a speed-control valve 70.

The above-mentioned directional control valve 60 and speed-control valve 70 are reciprocatingly moved by an operator to be position-controlled and the fluid pressure outputs from the valves 60 and 70 are selectively supplied to the forward-reverse shifting and speed-change clutch cylinders 11 to 15.

During the above mentioned operation, a bypass stream from the pressure regulator chamber 41 is filled in the torque converter 30 for torque amplification through a duct 40f and the back pressure thereof is maintained by a pressure regulating valve spool 51 mounted in the neutralizer valve 50.

Then, the fluid pressure is guided from the neutralizer valve 50 to a cooler 80 and then to clutch cooling sections 81 to 85 in the transmission clutch cylinders 11 to 15 and finally flows in a fluid receiver 86 which is a part of the fluid receiver 16.

A shift spool 52 in the neutralizer valve 50 is coupled with the operation of a brake pedal of a vehicle and actuates a three-way solenoid valve 90 in accordance with an operation signal therefrom. The flow path of the directional control valve 60 is controlled in association with the operation of the three-way solenoid valve 90. That is, the flow path to the directional control valve 60 is cut off and neutralized only when the operation signal for the brake pedal is generated regardless of the selected position of the directional control valve 60. The flow path is opened simultaneously with the extinction of the brake pedal operation signal and returns to its previous condition.

A cylindrical load piston 44 in the rate of rise valve or the fluid pressure control 40 is controlled by the fluid pressure in a signal pressure chamber 45 which is provided at the rear end of the control 40 and mechanical pressure generated by a spring 42 which is provided between the load piston 44 and the pressure regulating piston 43. That is, the spring 42 actuates the load piston 44 to perform a desired rate of rise regulation and also actuates the pressure regulating piston 43 in a desired manner.

The signal pressure chamber 45 is defined by the rear end face of the bore in the fluid pressure control 40 and the rear end face of the load piston 44.

In predetermined positions on the sliding surface of the load piston 44 in the bore of the fluid pressure control 40, there are disposed a first groove 46a, a second groove 46b and a third groove 46c communicating with the signal pressure chamber 45, a discharge port 47 and the inlet conduit 40a via the conduits 40g, 40h and 40i so as to extend in forward and backward directions.

In the conduit 40i, there is provided a timing orifice 40j adapted to control pumped pressure to be supplied to individual parts.

The grooves 46a to 46c are opened and closed in accordance with the movement of the load piston 44.

That is, the load piston 44 is provided with a first communication hole 44a which communicates with the first concave groove 46a in retrograded and intermediate positions of the piston and is closed in an advanced position thereof, a second communication hole 44b which communicates with the second concave groove 46b in the retrograded and intermediate positions thereof and communicates with the first concave groove 46a in the advanced position thereof, and a third communication hole 44c which communicates with the third concave groove 46c in the retrograded position thereof, is closed in the intermediate position thereof and communicates with the second concave groove 46b in the advanced position thereof.

In the conduit 40e, there is provided a one-way valve 40k adapted to lock return flow on the side of the signal pressure chamber 45 and a by-pass pipe 40m with an orifice 40l is connected to the one-way valve 40k.

Within the load piston 44, there is provided a shift piston 48 which is provided in an intermediate part thereof with a first annular groove 48a which communicates with the first and second communication holes 44a and 44b in a retrograded position of the piston 48 and communicates only with the first communication hole 44a in an advanced position thereof, and at the rear end thereof with a second annular groove 48b which communicates with the third communication hole 44c.

The shift piston 48 is actuated to the rear by a slightly soft spring 48c which is provided between the piston 48 and the load piston 44.

Between the rear end of the shift piston 48 and a rear end wall 44d of the load piston 44, a fill chamber 49 is defined.

Figure 2:
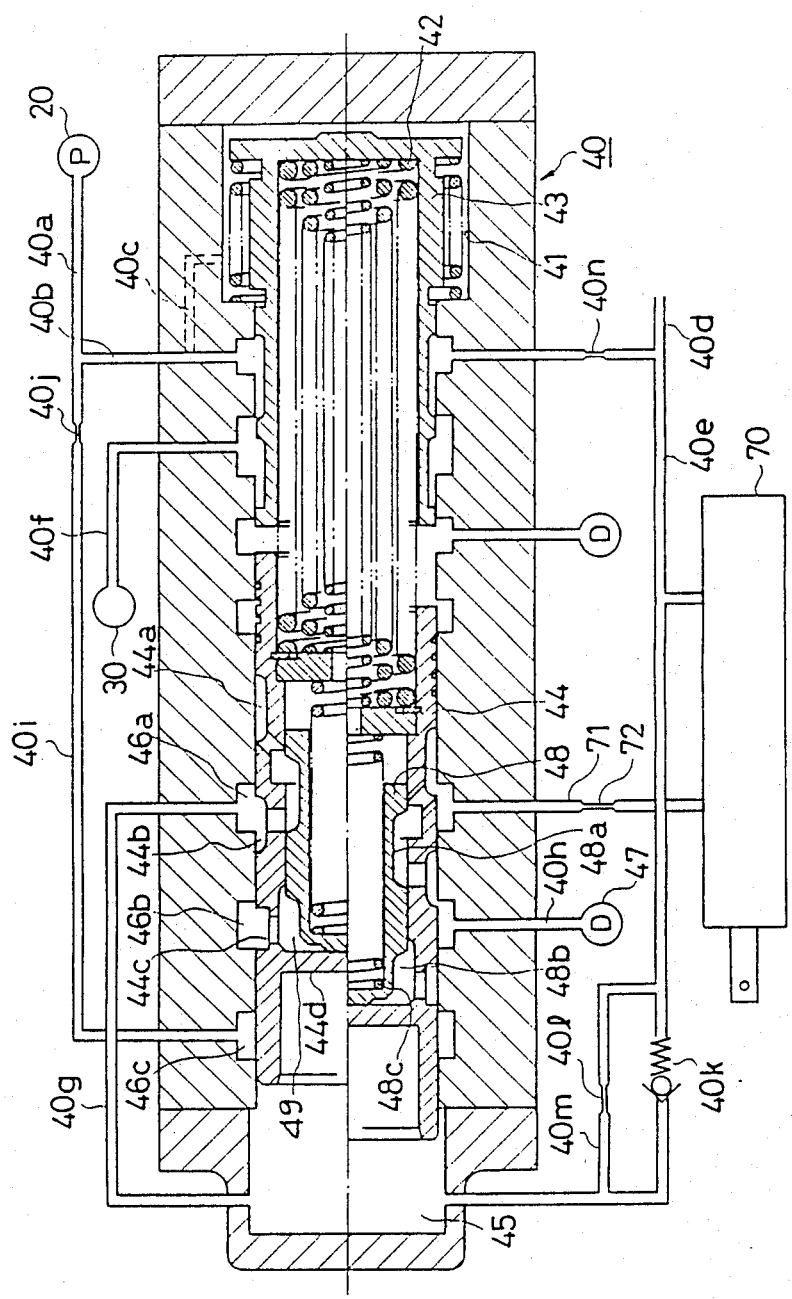
FIGS. 2 to 4 are longitudinal sectional views of the fluid pressure control according to the present invention, respectively showing operations at individual stages.

In the normal operation, the individual members are in the final pressure positions shown in the upper half part of FIG. 2.

When the directional control valve 60 or the speed-change valve 70 is shifted to a selected position, a transient pressure drop is caused by fluid flow into a selected shifting clutch cylinder, by which the load piston 44 discharges the fluid in the signal pressure chamber 45 through the one-way valve 40k and then retrogrades.

However, the fluid pressure will not rapidly reach the lowest value required owing to the cylinder capacity and the flow path routing conditions and the load piston 44 is moved to the intermediate position shown in the lower-half part of FIG. 2.

At that time, the shift piston 48 is actuated by the spring 48c to the retrograded position abutting on the rear end wall 44d of the load piston 44. The signal pressure chamber 45 communicates with the first concave groove 46a, while the discharge port 47 communicates with the second concave groove 46b.

Accordingly, the fluid in the signal pressure chamber 45 is discharged and the load piston 44 further retrogrades, and the lowest pressure required is obtained when the load piston reaches the rear-most end of the chamber.

The fluid supplied from the pump to the speed-control valve 70 through the orifice 40n is sent to the individual clutch cylinders 11 to 15 without being discharged from the signal pressure chamber 45 to the discharge port 47 through the one-way valve 40k. As a result each of the clutch cylinders 11 to 15 is filled at a pressure near the lowest pressure (see the upper half part of FIG. 3).

Figure 3:
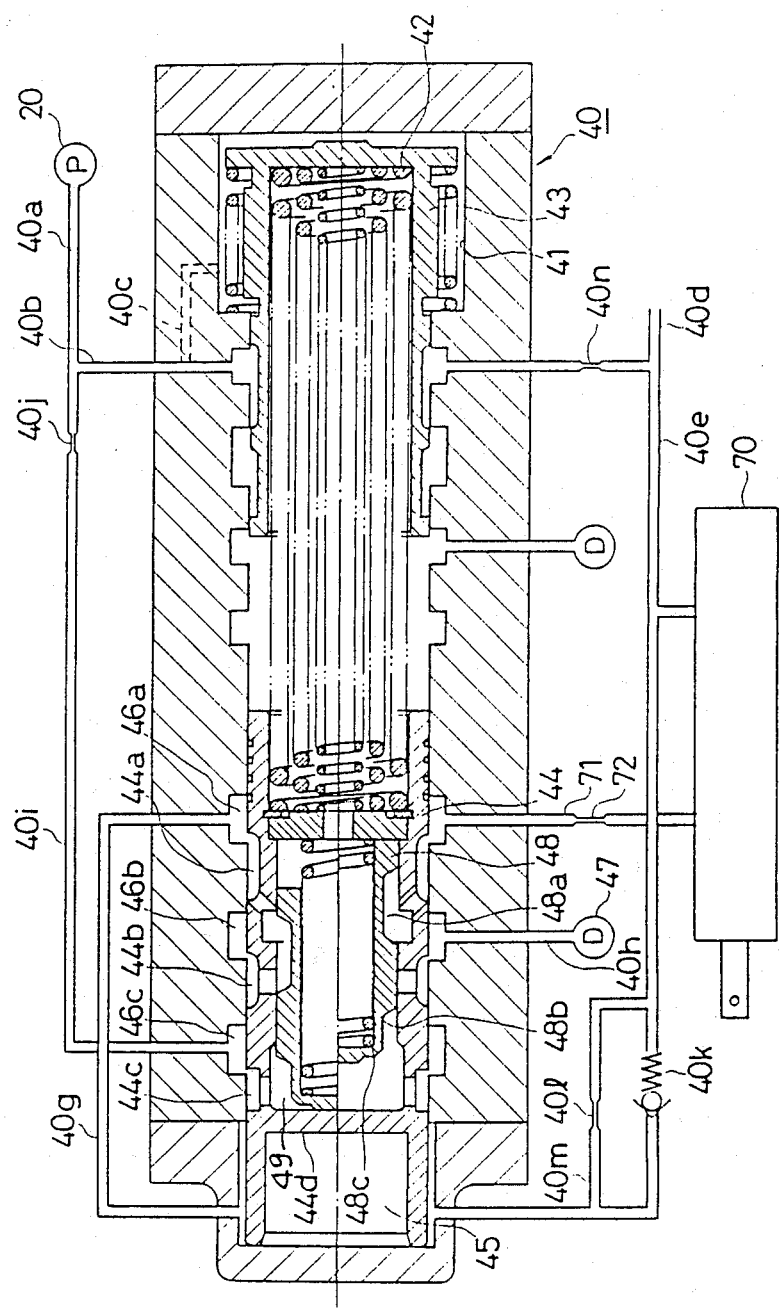

In the lowest pressure positions or the retrograded positions of the load piston 44 and the shift piston 48 shown in the upper-half part of FIG. 3, the third groove 46c communicates with the fill chamber 49 via the third communication hole 44c in the piston 48.

Accordingly, the fluid pressure from the pump 20 is supplied through the timing orifice 40j to the fill chamber 49 until the individual clutch cylinders are filled up.

Following the fluid pressure supply to the fill chamber, the shift piston 48 advances against the spring 48c as shown in the lower-half part of FIG. 3 to close the first and second communication holes 44a and 44b.

Accordingly, the fluid within the signal pressure chamber 45 is not discharged, and the signal pressure chamber 45 is pressurized by the fluid supplied from the pump 20 through the input conduit 40a, the conduit 40b, the pressure regulating chamber 41, the orifice 40n, the conduit 40e and the orifice 40l.

As a result, the load piston 44 is advanced at a predetermined speed to effect a smooth rise of hydraulic pressure and connection of the clutches.

In a controlling flow path 71 running from the first concave groove 46a to the speed control valve 70, there are provided orifices 72 respectively corresponding to individual speed stages, by which a favorable pressure rise can be obtained at each speed stage.

When the load piston 44 reaches the intermediate position, the first and second concave grooves 46a and 46b come into a condition under which the grooves can communicate with each other as shown in the lower-half part of FIG. 2. However, as shown in the upper-half part of FIG. 4, the both concave grooves 46a and 46b are closed by the shift piston 48, so that the load piston 44 further advances as it is to raise the fluid pressure to the highest value.

Figure 4:
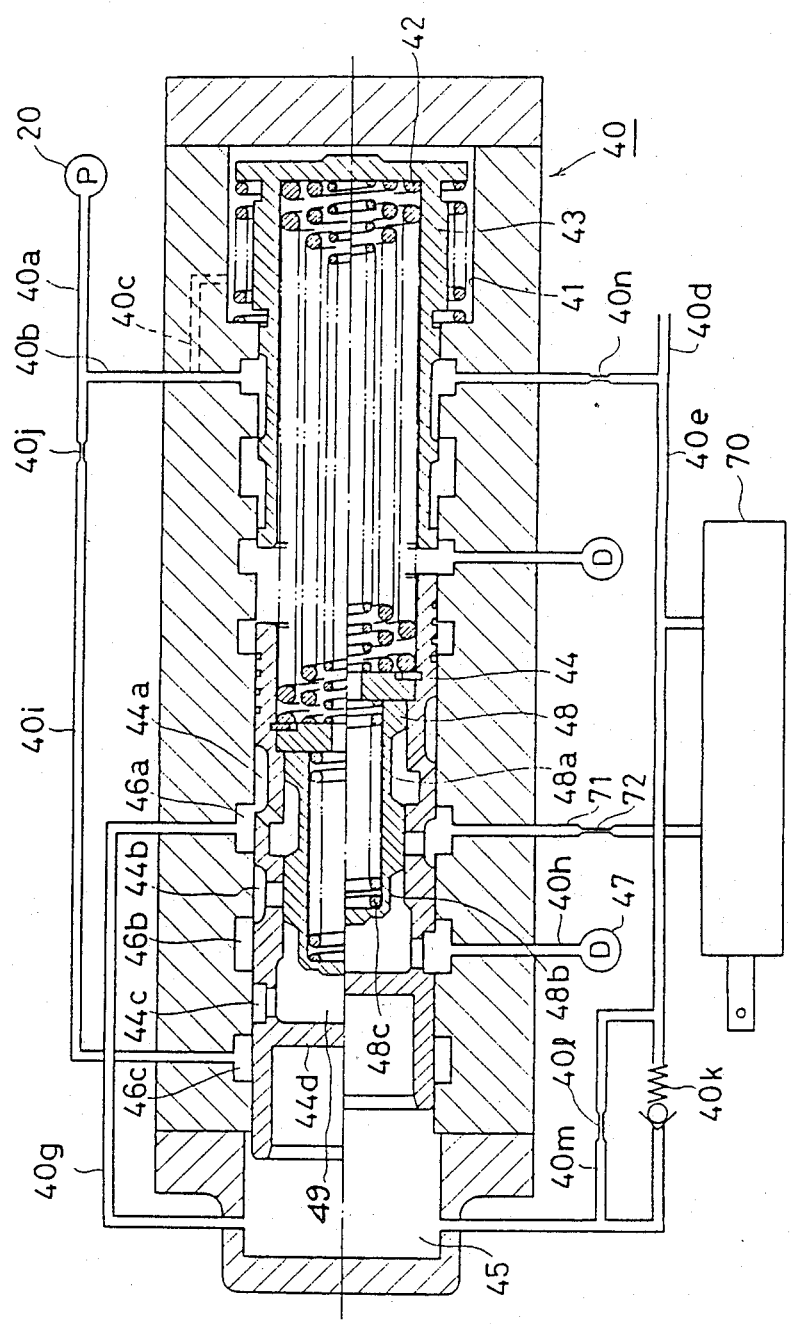

In this position, as shown in the lower-half part of FIG. 4, the fill chamber 49 within the load piston 44 communicates with the second concave groove 46b to discharge the fluid therein through the groove. On the other hand, the shift piston 48 moves to the retrograded position to complete the preparation for the following speed change.

As has been described above, according to the present invention, the discharge, fill and modulation of the hydraulic pressure required in the transmission can be effected by the operation of the load piston on predetermined schedule.

In addition, the above-mentioned functions can be attained only with the provision of the shift piston in the load piston, so that the entire structure can be simplified and miniaturization of the device can be realized.

What is claimed is:

1. A fluid pressure control for use in a transmission provided with a fluid pressure operated clutch comprising:
   a pressure regulating piston communicating with fluid from a pressurized fluid source for affording fluid pressure to said clutch;
   a load piston and a spring for pressing said pistons away from each other, wherein said load piston and said pressure regulating piston are reciprocally disposed in a common bore;
   a signal pressure chamber is formed between an end wall of said load piston and an end of said bore and communicates with a fluid passage to said clutch from said pressurized fluid source;
   in a sliding face of the load piston in said bore, there are provided a first concave groove communicating with said signal pressure chamber, a second concave groove communicating with a discharge port and a third concave groove communicating with the pressurized fluid source via a timing orifice; and
   a shifting piston which reciprocatingly moves between open and closed positions is provided within said load piston, thereby increasing and reducing pressure within said signal pressure chamber in accordance with positions of said load piston and said shifting piston.

2. A fluid pressure control as defined in claim 1 wherein an orifice for controlling ratio of modulation is provided between said signal pressure chamber and said pressurized fluid source.

3. A fluid pressure control as defined in claim 2 wherein a one-way valve for reducing lag upon initial discharge of fluid is provided in parallel with said orifice.

4. A fluid pressure control as defined in any of claims 1 to 3 wherein a timing orifice for controlling pumped pressure to be supplied to individual parts is provided between the third concave groove and said fluid source, and a fill chamber is formed between ends of said load piston and said shifting piston so as to introduce pressurized fluid from said source thereinto in accordance with the position of said load piston.

5. A fluid pressure control as defined in claim 4 wherein said shifting piston is biased by a spring in a predetermined direction so as to slide in the predetermined direction within the load piston, thereby reducing the capacity of said fill chamber.

* * * * *